Sheet 2.
2 Sheets.

S. B. Reed.
Revolving Rake.

N° 51969  Patented Jan. 9, 1866.

Witnesses.

Inventor.
Stephen B. Reed
By David A Burr
Attorney

UNITED STATES PATENT OFFICE.

STEPHEN B. REED, OF STUYVESANT, NEW YORK.

IMPROVEMENT IN HORSE-RAKES.

Specification forming part of Letters Patent No. 51,969, dated January 9, 1866.

*To all whom it may concern:*

Be it known that I, STEPHEN B. REED, of Stuyvesant, in the county of Columbia and State of New York, have invented a new and useful Improvement in Horse Hay-Rakes; and I do hereby declare the following to be a full, clear, and exact description thereof, reference being had to the accompanying drawings, forming a part of this specification, in which—

Figure 1:
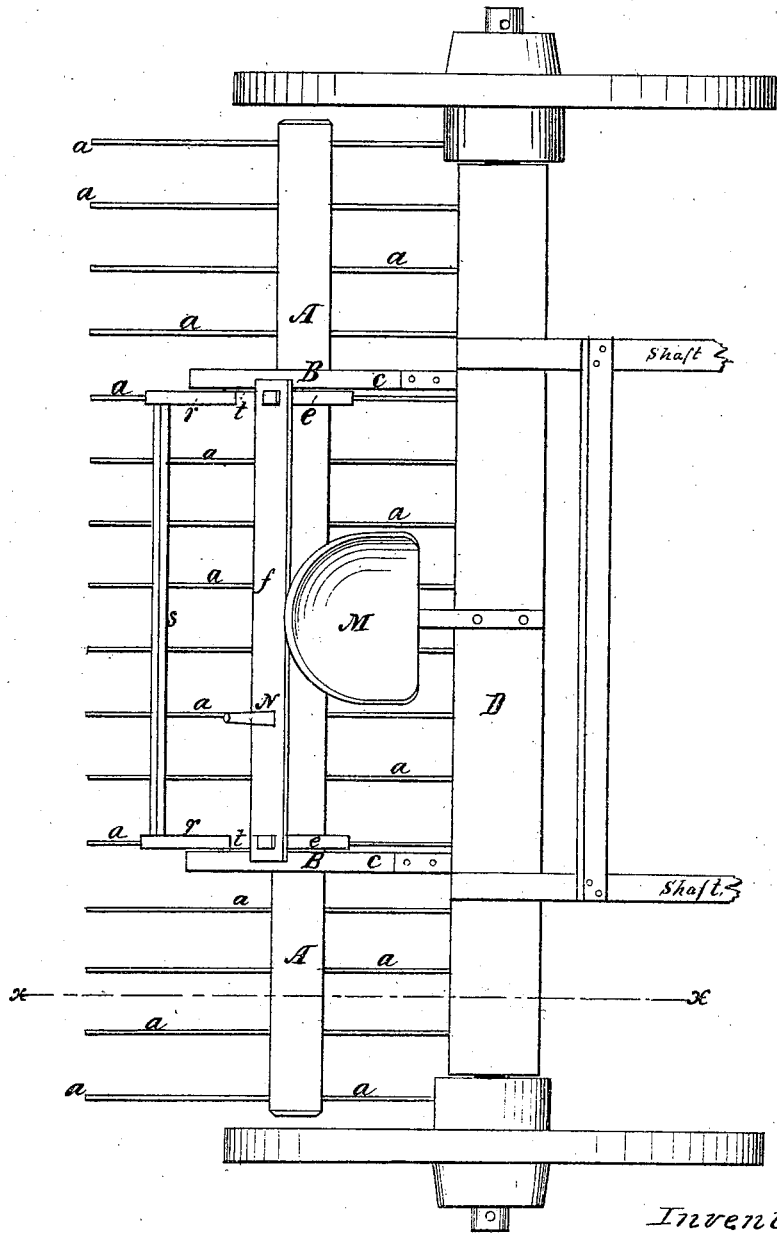
Figure 2:
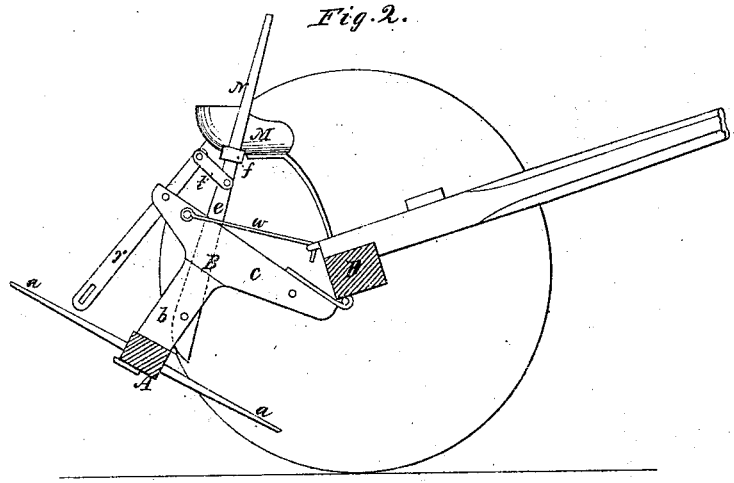
Figure 3:
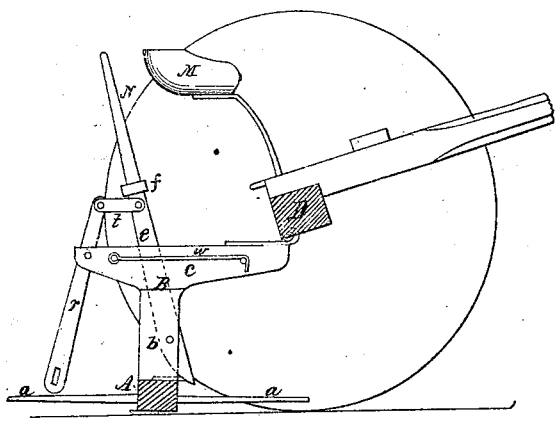
Figure 4:
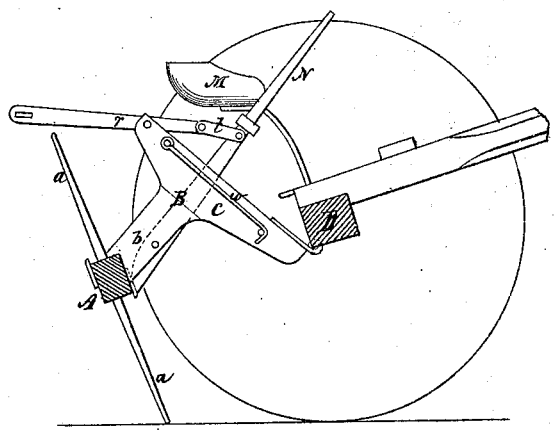

Figure 1 is a top or plan view of my improved rake; and Figs. 2, 3, and 4 sectional elevations in the line $x\ x$ of Fig. 1, showing, respectively, first, the machine with the rake hooked up ready for transportation to or from the field; second, at work; and, third, revolving so as to discharge the hay accumulated thereon, and illustrating the relative positions of the several parts of the machine in each case.

Similar letters indicate like parts in all of the figures.

The nature of my invention consists of a novel combination of levers with a revolving rake carried by an axle and wheels, by means whereof the action of the rake is controlled.

My revolving rake is constructed of a square shaft, A, fitted with projecting elastic teeth $a\ a\ a$, inserted through the same at regular intervals in the usual manner, and it is attached to the axle D by means of two T-shaped supports, B B, each consisting of an upright, $b$, framed into an upper transverse bar, $c$, at right angles thereto, as represented in Figs. 2, 3, and 4 of the drawings. The front ends of these upper transverse bars, $c\ c$, of the supports B, are pivoted or hinged to the under side of the axle D, and the shaft A of the rake passes through suitable boxes in the lower ends of the uprights $b\ b$ of the supports, so as to revolve freely therein behind the axle. These uprights $b\ b$ are of such a length as that when the upper bars, $c\ c$, pivoted to the axle, are in a horizontal plane the rake will then rest upon the ground, as seen in Fig. 3, the length of the inner arms of these bars $c\ c$ being also so proportioned as to give free room for the revolution of the rake behind the axle, as seen in Fig. 4.

To the inner faces of the uprights $b\ b$ of the supports B B, by which the rake is secured, I pivot, at about one-third of the distance above the rake-shaft A, levers $e\ e$, leaving their longer upper arms to project somewhat above the transverse bars $c\ c$ of the supports, and connecting them together by a cross-piece, $f$. These levers $e\ e$ incline to the front, and their lower ends are so formed as to bear directly upon the front edge of that face of the rake-shaft A which may be uppermost. Hence, when the upper ends of the levers are drawn forward the lower ends, bearing upon the front edges of the shaft, will cause it to turn in its bearings in that direction sufficiently to force the front ends of the teeth $a\ a$ against the ground, which, as the machine is being drawn forward, will cause it to make an entire revolution in the manner illustrated in Fig. 4 of the drawings.

In order to steady the rake when at work and prevent it from revolving except at the will of the driver, I pivot a second system of levers, $r\ r$, to the inner side of the rear projecting arms of the upper bars, $c\ c$, of the supports B B, leaving their lower and longer ends to extend out nearly to the ends of the rake-teeth $a\ a\ a$, (when these are in a horizontal plane, as seen in Fig. 3,) and there uniting them by a cross-piece, $s$, which will rest upon the entire series of teeth, as seen in Fig. 1. The upper short ends of these levers $r\ r$ are each connected to the upper extremity of the opposite operating-lever, $e$ and $e$, by links $t\ t$, pivoted at both ends. Hence, when the operating-levers $e\ e$ are at rest, leaving the rake A in a nearly horizontal position, the cross-piece $s$ of the stay-levers $r\ r$, resting upon the rear ends of the teeth, will hold them down in place and prevent a revolution of the rake; but when the upper ends of the operating-levers are drawn forward, so that their lower ends shall bear upon the rake-shaft to tip it forward and engage the front ends of the teeth with the ground, the upper ends of the stay-levers will also be drawn forward by means of the connecting-links $t\ t$, so as to elevate their lower ends, with the cross-piece $s$, above and clear of the teeth, leaving the rake free to revolve in its bearings.

The entire rake may be lifted clear of the ground and be so suspended by hooking the rear ends of the cross-bars $c\ c$ of the supports B B to the axle, as seen in Fig. 2 of the drawings, hooks $w\ w$ being provided for that purpose.

The driver, sitting on a seat, M, placed centrally over the axle, actuates the levers *e e* at pleasure by means of a suitable rod or handle, N, projecting up within his reach from the cross-piece *f*, which connects the upper ends of the operating-levers *e e*.

Having thus fully described my improvement in horse hay-rakes, what I claim therein as new, and desire to secure by Letters Patent, is—

1. The combination of the levers *e e* with the rectangular supports B B, hinged to the axle D, and with the shaft of a revolving hay-rake, A, all substantially in the manner and for the purpose herein set forth.

2. The combination and arrangement of the auxiliary stay-levers *r r* with the operating-levers *e e* and the revolving rake A, substantially in the manner and for the purpose herein set forth.

The foregoing specification of my improvement in horse hay-rakes signed by me this 7th day of March, A. D. 1865.

STEPHEN B. REED.

In presence of—
  S. H. WENDORER,
  H. B. HALL.